United States Patent [19]

Hann

[11] 4,341,269
[45] Jul. 27, 1982

[54] WING BACK IMPLEMENT

[75] Inventor: Simon A. Hann, Nobleford, Canada

[73] Assignee: Versatile Cornat Corporation, Vancouver, Canada

[21] Appl. No.: 134,581

[22] Filed: Mar. 27, 1980

[30] Foreign Application Priority Data

Feb. 27, 1980 [CA] Canada ................................. 346549

[51] Int. Cl.² ........................................... A01B 73/00
[52] U.S. Cl. ................................ 172/311; 280/411 A
[58] Field of Search ....................... 172/311, 456, 662; 56/228, 385; 280/411 R, 411 A, 656

[56] References Cited

U.S. PATENT DOCUMENTS

| | | | |
|---|---|---|---|
| 2,706,881 | 4/1955 | McDonald | 280/656 X |
| 3,162,459 | 12/1964 | Marmorine et al. | 280/656 |
| 3,935,696 | 2/1976 | Pavel | 56/385 |
| 3,960,221 | 6/1976 | Blair et al. | 172/311 |
| 3,982,773 | 9/1976 | Stufflebeam et al. | 280/656 |
| 4,066,274 | 1/1978 | Adee | 172/311 X |
| 4,098,347 | 7/1978 | Honnold | 172/311 |
| 4,211,287 | 7/1980 | Garrison | 172/311 |

FOREIGN PATENT DOCUMENTS

| | | | |
|---|---|---|---|
| 456215 | 8/1973 | Australia | 172/311 |
| 800311 | 12/1968 | Canada . | |
| 842527 | 5/1970 | Canada . | |
| 892910 | 2/1972 | Canada . | |
| 1041825 | 11/1978 | Canada | 172/311 |
| 1049832 | 3/1979 | Canada . | |
| 1947036 | 3/1971 | Fed. Rep. of Germany | 172/311 |
| 1424321 | 2/1976 | United Kingdom | 172/456 |
| 650535 | 3/1979 | U.S.S.R. | 172/311 |

Primary Examiner—Richard T. Stouffer
Attorney, Agent, or Firm—Wenderoth, Lind & Ponack

[57] ABSTRACT

A tillage implement is disclosed which facilitates transporting the implement from one field of operation to another. The implement comprises a stabilizer bar located behind the point where the implement may be "winged-back". In so doing, transport problems are reduced and the number of frame sections of the implement may be increased without increasing the width or height of the transported vehicle.

4 Claims, 4 Drawing Figures

WING BACK IMPLEMENT

FIELD OF THE INVENTION

This invention relates to a new and improved implement design and, particularly, to a new and improved implement which is adapted for transport between two locations.

BACKGROUND AND SUMMARY OF THE INVENTION

In tilling soil, such as when planting seed, eliminating weeds, or preparing the soil for planting or treating crops, implements are used which are designed to be pulled behind a source of tractive power, such as a tractor or crawler. These implements may take several forms but chisel tooth plows, sometimes known as field cultivators, rod weeders, spring tooth cultivators, blade cultivators, and disc cultivators are common. While generally acting as intended under operating conditions in the field, these implements present problems when it is desired to transport them between two fields located in non-contiguous area. Frequently, the implements may have to be transported over public roads, under wires or bridges or through tunnels or culverts where the implement is not designed to go. Obviously undesirable are the safety and size characteristics inherent in such equipment.

Various manufacturers have produced equipment designed to overcome these deficiencies. It is known, for example, that an implement comprising several frame sections located on opposite sides of the longitudinal axis of the implement may have a longitudinal axis about which the end sections on each side of the implement rotate first upwardly and then inwardly. This technique, while it reduces the width of the implement behind the tractor and may, therefore, meet either legal or other width transportation requirements in effect for public roads, increases the height of the implement which may create problems in going under wires or low bridges or through tunnels or culverts. Furthermore, this type of implement is inherently dangerous to pedestrians and other vehicles in the vicinity of the transported implement because the tillage tools are directly exposed on both sides of the transported implement. Further, the implement requires a hydraulic system capable of rotating the heavy and unwieldy several frame sections upwardly and, if the hydraulic system should fail, or, for some other reason, the frame sections fall either while being raised to their transportable positions or while the implement is being transported, injury and damage may result. Despite the reduction in width of the transported implement by using the "wing up" design, the trend today is towards larger implements as increased tractive power becomes available. As extra frame sections are added, the width increases as well as the height.

Thus, if legal or practical limitations exist on the width or height of the implement when being transported, the size of the implement may be undesirably restricted.

A further disadvantage of present tillage implements is that the reinforcing means used to provide bracing between the tongue of the implement and the various frame sections extends forwardly from the frame section. As additional frame sections are added, the reinforcing means must extend further outwardly from the longitudinal axis of the implement. Thus, unless the opposite end of the reinforcing means is moved forwardly, the effectiveness of the reinforcing means decreases. This may, therefore, necessitate a greater tongue length which increases the distance of the tillage tool from the tractor. With this increased length between the tool and the tractor, the contour of the ground is not followed as closely as is possible and unnecessary tillage depth or no tillage at all may result.

Other manufacturers have produced implements which, after being operated, are transported by disconnecting the tongue from the tractor and reconnecting the tractor to one of the transverse ends of the implement. Thus, the implement is transported behind the tractor by one of the transverse ends which reduces the transverse width of the implement exposed beyond the sides of the tractor.

There are, however, unnecessary problems existing in this implement design as well. The operator must leave the tractor and move it both to disconnect the operating hitch from the implement and to connect the transport hitch. The wheels beneath the implement must be designed to castor since the implement is pulled by the tractor both transversely and longitudinally. While this usually does not substantially affect the implement under operating conditions, the track of the implement while under transport may be of concern. Further, because the length of the implement is the same as its transverse width, the length under transport may create unnecessary unsafe conditions such as when pulling the implement around tight corners.

According to the present invention, there is disclosed an implement used for tillage purposes comprising a tongue adapted for connection at one end to a source of pull power, a centre frame connected to the opposite end of said tongue, sub-frames connected to said centre frame on respective opposite sides of said centre frame by substantially horizontal axes which are adapted to allow independent vertical movement of said sub-frames relative to said centre frame, a plurality of end frames attached to said sub-frames and extending outwardly therefrom in a generally diverging V-shaped configuration, said end frames being interconnected by substantially horizontal axes adapted to allow independent vertical movement of each respective end frame relative to its adjoining end frame, said end frames being adapted for pivotal rotation about substantially vertical wing-back pivot points located on said sub-frames on respective opposite sides of the centre of said implement, wheel means mounted below said centre frame, said sub-frames and said end frames to allow movement of said implement, the wheel means on said centre frame and sub-frames operating independently of the wheel means mounted on said end frames, and reinforcement members moveable between extended and retracted positions and being located symmetrically on opposite sides of the centre of said implement, one end of each of said reinforcement means being rotatably mounted on said centre frame behind said wing-back pivot points and the other of each respective end being rotatably mounted on one of said end frames, whereby said implement is adapted for operation when said reinforcement means is extended and for transportation when retracted.

DESCRIPTION OF PREFERRED EMBODIMENTS

The invention will now be described, by way of example only, with reference to the accompanying drawings, in which.

Figure 1:
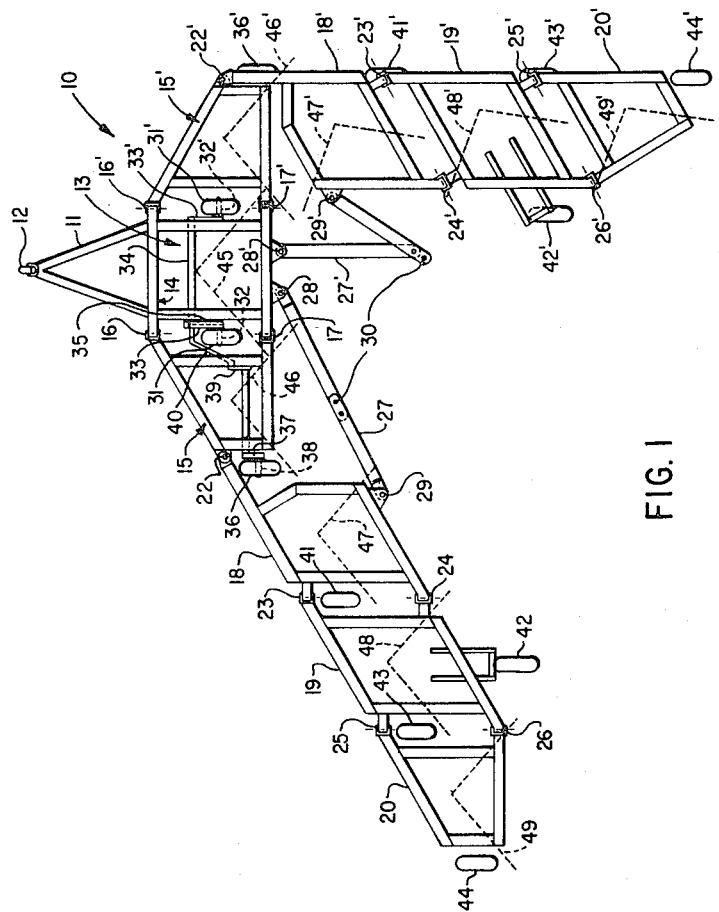
FIG. 1 is a plan view of one embodiment of the invention depicting the tillage implement in both its operating and transport conditions.

Referring now to FIG. 1, a tillage implement is generally denoted 10 and comprises a tongue 11 with pivotable hitching point 12 adopted to be connected to a pulling vehicle such as a tractor or crawler. Located rearwardly of the hitching point and connected to the opposite end of tongue 11 is a central frame section 13 which consists of centre frame 14 and two sub-frames 15,15'. Sub-frames 15,15' are pivotably connected to centre frame 14 by hinges 16, 16', 17, 17' respectively, which allow sub-frames 15,15' to rotate relative to centre-frame 14 about horizontal and longitudinally extending axes.

Located on each side of the central frame section 13 and extending generally outwardly and rearwardly therefrom are three end frames 18,18', 19,19', 20,20', respectively. Inner end frames 18,18' are connected to central frame section 13 through connections located at wing back pivot points 22, 22' which allow rotatable movement about axes extending vertically from the implement and perpendicular to its longitudinal axis.

Middle end frames 19, 19' are pivotably connected to inner end frames 18, 18' through hinged connections 23, 23', 24, 24', respectively and outer end frames 20, 20' are connected to middle end frames 19, 19' through similar hinged connections 25, 25', 26, 26' respectively. Hinged connections 23, 23', 24, 24', 25, 25', and 26, 26' allow rotatable movement of the end frames relative to each other about axes parallel to the longitudinal axis of the implement when in operating position.

Stabilizing or reinforcing bars 27,27' are pivotally connected at end portions 28, 28' to the central frame section 13 and at the opposite ends 29, 29' to inner end frames 18, 18'. Stabilizing bars 27, 27' are designed so that they may be kept in substantially rigid condition under operating conditions by having the axis 30 move slightly beyond the center line of each reinforcing bar. Alternatively, locking pins may be used.

Below the central frame section 13 are mounted pneumatic tires and wheels 31, 31'. Wheels 31, 31' have solid shafts and are each rotatably mounted on spindles 32, 32' extending from throws 33, 33' which, in turn, extend from axle 34. A link arm 35 extends upwardly and rearwardly from axle 34 and is rigidly attached thereto.

Wheels 31, 31' are not adapted for castoring movement but rather rotate about an axis transverse to the longitudinal axis of the implement. Wheels 36, 36' are mounted similarly to wheels 31, 31' with only wheel 31 shown connected with its throw 37, axle 38, and link arm 39. A connecting link 40 extends between link arms 35, 39.

Mounted below the end frames 18, 18', 19, 19', 20, 20' are wheels and tires 41, 41', 42, 42', 43, 43', 44, 44', respectively. Each wheel is similarly mounted for castoring movement on a spindle (not shown) which extends through the ends of a fork (not shown). The fork is mounted for rotatable movement about a vertical axis. The axles of the respective wheels are connected by link arms and connecting links and since this type of connection is well known, it is not considered necessary to describe them.

Cultivator blades 45, 46, 46', 47, 47', 48, 48', 49, 49', are respectively located below the centre frames 14, the end sub-frames 15, 15', the inner end frames 18, 18', the middle end frames 19, 19', and the outer end frames 20, 20'. Since each blade is identical, only one will be described.

Figure 4:
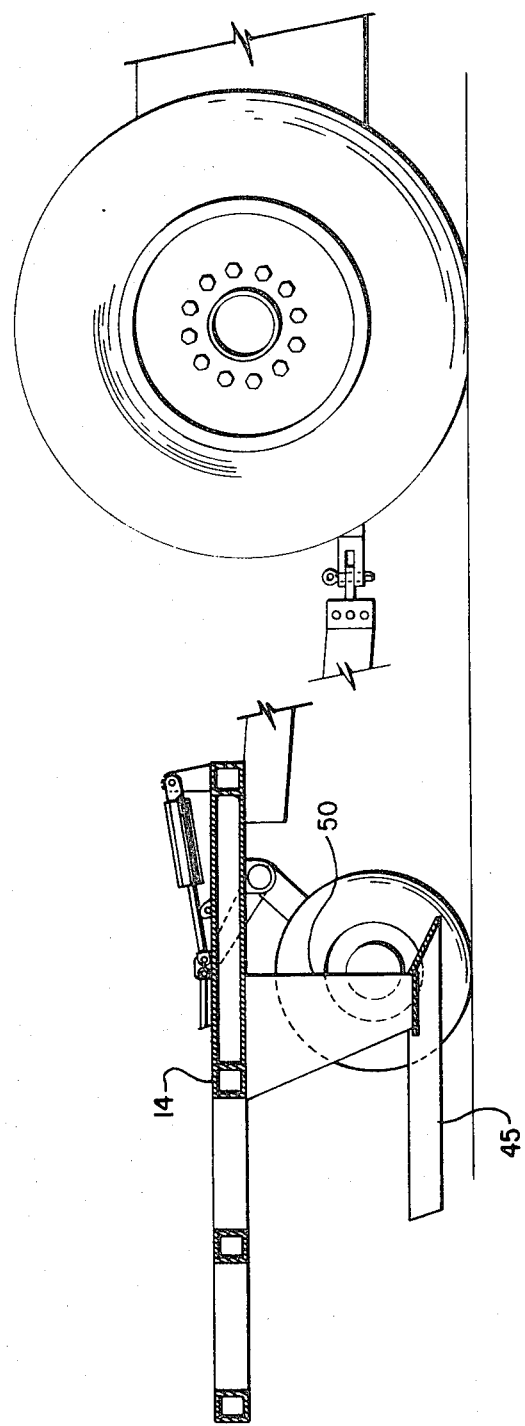
FIG. 4 is a side view showing the implement according to the invention being pulled behind a tractor.

Referring to FIG. 4, blade 45 is rigidly connected to shank 50, which, in turn, is connected to central sub-frame 14.

In operation, when it is desired to transport the implement to another location which necessitates a narrower transverse width from that needed when tillage occurs, the operator moves the wheels downwardly to raise centre frame, the sub-frames, and the the end frames and, accordingly, the cultivator blades. Stabilizing bars 27, 27' are retracted and, by hydraulic means or otherwise, the rearwardly and outwardly extending end frames 18, 18', 19, 19', 20, 20', are drawn together as they rotate about wing-back pivot points 22, 22'. Many of such hydraulic means are commonly used in the art and it is not considered necessary to describe them. When the implement is drawn together, the two halves are locked together, again as may be accomplished with known apparatus. The implement may then be conveniently transported to another location.

Figure 2:
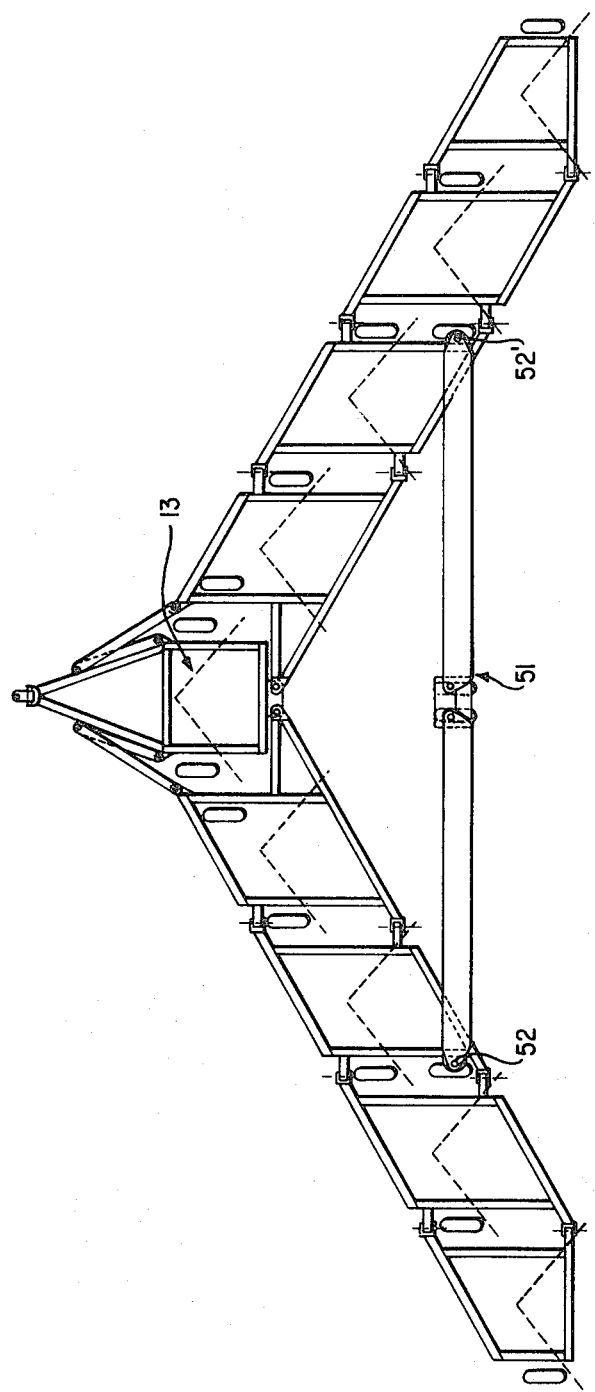
FIG. 2 is a plan view showing a further embodiment of the invention in its operating condition.
Figure 3:
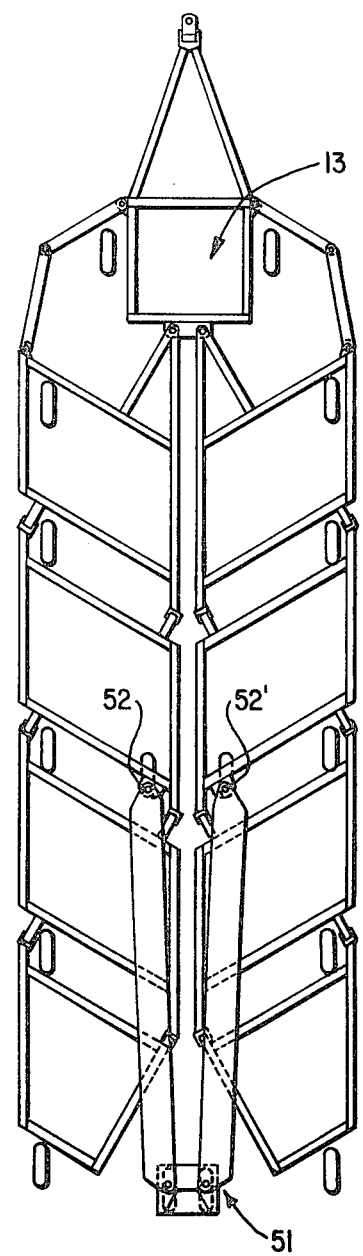
FIG. 3 is a further view of the implement of FIG. 2 in its transport condition.

A second embodiment of the invention is shown in FIGS. 2 and 3. In this embodiment the central frame section 13 has no central sub-frames 15, 15' as shown in FIG. 1. This allows the implement to be transported in a configuration shown in FIG. 3 which is narrower than that shown in FIG. 1. In this embodiment, only one stabilizing or reinforcing bar 51 is shown and this stabilizing or reinforcing bar 51 is pivotably connected between the frame sections at 52, 52'.

Accordingly there has been described a novel and improved implement design which obviates or reduces many of the problems associated with previous implements. Many modifications will occur to those skilled in the art which modifications will, however, not depart from the spirit of the invention. The invention should therefore, be construed only with reference to the accompanying claims.

What is claimed is:

1. An implement used for tillage purposes comprising a tongue adapted for connection at one end to source of pull power, a centre frame connected to the opposite end of said tongue, sub-frames connected to said centre frame on respective opposite sides of said centre frame by substantially horizontal axes which are adapted to allow independent vertical movement of said sub-frames relative to said centre frame, a plurality of end frames attached to said sub-frames and extending outwardly therefrom in a generally diverging V-shaped configuration, said end frames being interconnected by substantially horizontal axes adapted to allow independent vertical movement of each respective said end frame relative to its adjoining end frame, said end frames being adapted for pivotal rotation about substantially vertical wing-back pivot points located on said sub-frames on respective opposite sides of the centre of said implement, wheel means mounted below said centre frame, said sub-frames and said end frames to allow movement of said implement, the wheel means on said centre frame and sub-frames operating independently of the wheel means mounted on said end frames, and reinforcement members moveable between extended and retracted positions and being located symmetrically on opposite sides of the centre of said implement, one end of each of said reinforcement means being rotatably mounted on said centre frame behind said wing-back pivot points and the other of each respective end being rotatably mounted on one of said end frames, whereby said implement is adapted for operation when said reinforcement means is extended and for transportation when retracted.

2. An implement used for tillage purposes comprising a tongue adapted for connection at one end to a source of pull power, a centre frame connected to the opposite end of said tongue, a plurality of end frames extending outwardly from said centre frame in a generally diverging direction, sub-frames interconnected between said centre frame and said end frames on respective opposite sides of the centre of said implement, said sub-frames being connected to said centre frame about substantially horizontal axes to allow independent vertical movement of said sub-frames relative to said centre frame, said end frames being interconnected by substantially horizontal axes adapted to allow independent vertical movement of each respective said end frame relative to its adjoining said end frame, said end frames being adapted for pivotal rotation about substantially vertical wing-back pivot points located on said sub-frames on opposite sides of the longitudinal axis of said implement, wheel means mounted below said centre frame, said sub-frames and said end frames to allow movement of said implement, the wheel means mounted on said centre frame and said sub-frames operating independently of the wheel means mounted on said end frames, and reinforcement means movable between extended and retracted positionsand being pivotally connected behind said wing-back pivot points, said reinforcement means acting to provide reinforcement for said end frames on respective opposite sides of said centre frame when in the extended position whereby the implement is adapted for operation when said reinforcement means is extended and for transportation when retracted.

3. An implement as in claim 2 wherein said reinforcement means comprises members located symmetrically on opposite sides of the centre of said implement, one end of each respective said reinforcement means being rotatably mounted on said centre frame and the other end of each said respective reinforcement means being rotatably mounted on respectively opposed said end frames.

4. An implement as in claim 3 wherein at least one tillage tool is operatively mounted on each of said centre frame, said sub-frames and said end frames.

* * * * *